United States Patent
Boesch (10) Patent No.: US 10,145,349 B2
(45) Date of Patent: Dec. 4, 2018

(54) COMBINED COOLANT AND TRANSMISSION PUMP MOTOR DRIVE FOR STOP-START VEHICLE

(71) Applicant: FORD GLOBAL TECHNOLOGIES, LLC, Dearborn, MI (US)

(72) Inventor: Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 899 days.

(21) Appl. No.: 14/174,186

(22) Filed: Feb. 6, 2014

(65) Prior Publication Data

US 2015/0219056 A1    Aug. 6, 2015

(51) Int. Cl.
| | | |
|---|---|---|
| B60K 6/00 | (2006.01) | |
| F02N 11/08 | (2006.01) | |
| F02N 11/00 | (2006.01) | |
| F16H 61/00 | (2006.01) | |

(52) U.S. Cl.
CPC ........ F02N 11/0814 (2013.01); F02N 11/003 (2013.01); F16H 61/0031 (2013.01); *F16H 2061/0037* (2013.01); *Y02T 10/48* (2013.01)

(58) Field of Classification Search
CPC ......... B60K 6/40; B60W 10/06; B60W 10/08; B60W 10/30; B60W 20/00; Y02T 10/6286
See application file for complete search history.

(56) References Cited

U.S. PATENT DOCUMENTS

| | | | | |
|---|---|---|---|---|
| 7,794,211 | B2* | 9/2010 | Muhs | B01D 21/0012 |
| | | | | 417/199.2 |
| 8,355,859 | B2 | 1/2013 | Maki et al. | |
| 8,459,389 | B2 | 6/2013 | Myers et al. | |
| 2002/0091034 | A1 | 7/2002 | Nakamori et al. | |
| 2004/0045749 | A1* | 3/2004 | Jaura | B60K 6/22 |
| | | | | 180/65.26 |
| 2008/0032842 | A1* | 2/2008 | Johnson | F02D 29/04 |
| | | | | 475/5 |
| 2012/0258838 | A1* | 10/2012 | Hartz | B60K 6/40 |
| | | | | 477/5 |
| 2014/0095056 | A1* | 4/2014 | Rademacher | F02N 11/084 |
| | | | | 701/112 |

FOREIGN PATENT DOCUMENTS

WO        2010057719 A1    5/2010

* cited by examiner

*Primary Examiner* — Hai Huynh
*Assistant Examiner* — Gonzalo Laguarda
(74) *Attorney, Agent, or Firm* — David B. Kelley; Brooks Kushman P.C.

(57) ABSTRACT

A vehicle includes an internal combustion engine having an auto stop function, an electric pump motor drivably coupled to a transmission pump and a heat exchanger pump, and at least one controller. The controller is configured to control the pump motor to operate the transmission pump to supply hydraulic pressure to a transmission, and to operate the heat exchanger pump to provide flow from the engine to a heater core radiator in response to the engine being auto stopped.

13 Claims, 7 Drawing Sheets

COMBINED COOLANT AND TRANSMISSION PUMP MOTOR DRIVE FOR STOP-START VEHICLE

TECHNICAL FIELD

The disclosure relates to vehicles with engine auto stop and auto start logic and auxiliary pumps that are activated when the engine is auto stopped.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A vehicle according to the present disclosure includes an internal combustion engine having an auto stop function, an electric pump motor drivably coupled to a transmission pump and a heat exchanger pump, and at least one controller. The controller is programmed to auto stop and auto start the engine. The controller is further programmed to, in response to auto stopping the engine, control the pump motor to operate the transmission pump to supply hydraulic pressure to a transmission and to operate the heat exchanger pump to provide flow from the engine to a heater core radiator.

In one embodiment, the electric pump motor has an end shaft configured to drive the transmission pump and the heat exchanger pump. In another embodiment, the electric pump motor has a first end shaft configured to drive the transmission pump and an opposing second end shaft configured to drive the heat exchanger pump. In yet another embodiment, the electric pump motor configured to directly drive one of the transmission pump and the heat exchanger pump, and configured to indirectly drive the other of the transmission pump and the heat exchanger pump. In a further embodiment, the electric pump motor is a variable speed motor.

A method for controlling a vehicle having an internal combustion engine configured to auto-stop according to the present disclosure includes auto stopping an engine of the vehicle. The method further includes, in response to the engine being auto stopped, controlling an electric pump motor that is drivably coupled to a transmission pump and a heat exchanger pump to operate the transmission pump to supply hydraulic pressure to a transmission and to operate the heat exchanger pump to provide flow from the engine to a heater core radiator.

In one embodiment of the method, controlling the electric pump motor includes varying a motor speed in response to a transmission hydraulic pressure demand or a heater core fluid demand.

A stop start system for a vehicle having an engine according to the present disclosure includes a controller. The controller is programmed to, in response to the engine being auto stopped, control at least one electric pump motor to operate a transmission pump to supply hydraulic pressure to a transmission and to operate a heat exchanger pump to provide flow from the engine to a heater core radiator.

In one embodiment, the at least one electric pump motor is a single electric pump motor drivably coupled to the transmission pump and to the heat exchanger pump. In one such embodiment, the electric pump motor has an end shaft configured to drive the transmission pump and the heat exchanger pump. In another such embodiment, the electric pump motor has a first end shaft configured to drive the transmission pump and an opposing second end shaft configured to drive the heat exchanger pump. In yet another such embodiment, the electric pump motor is configured to directly drive one of the transmission pump and the heat exchanger pump, and to indirectly drive the other of the transmission pump and the heat exchanger pump. In a further embodiment, the electric pump motor is a variable speed motor.

Embodiments according to the present disclosure provide a number of advantages. For example, the present disclosure provides a stop-start vehicle having a combined pump motor control system for both an auxiliary transmission pump and a cabin heat exchanger pump. Some embodiments according to the present disclosure also provide a common pump motor driving both the auxiliary transmission pump and the cabin heat exchanger pump. The control structure is thus simplified and redundant components may be eliminated, reducing cost, weight, and complexity.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop-start vehicles are powered by conventional internal combustion engines and equipped with a stop-start system controlling auto-stop and auto-start functions. The stop-start system may auto-stop the engine when the vehicle is stopped and the engine is not required for propulsion or other purposes. At a later time, the stop-start system may auto-start the engine when required for propulsion or other purposes. By disabling the engine when possible, overall fuel consumption is reduced. Unlike true hybrid vehicles, stop-start vehicles are not capable of pure electric propulsion. Furthermore unlike true hybrid vehicles, stop-start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
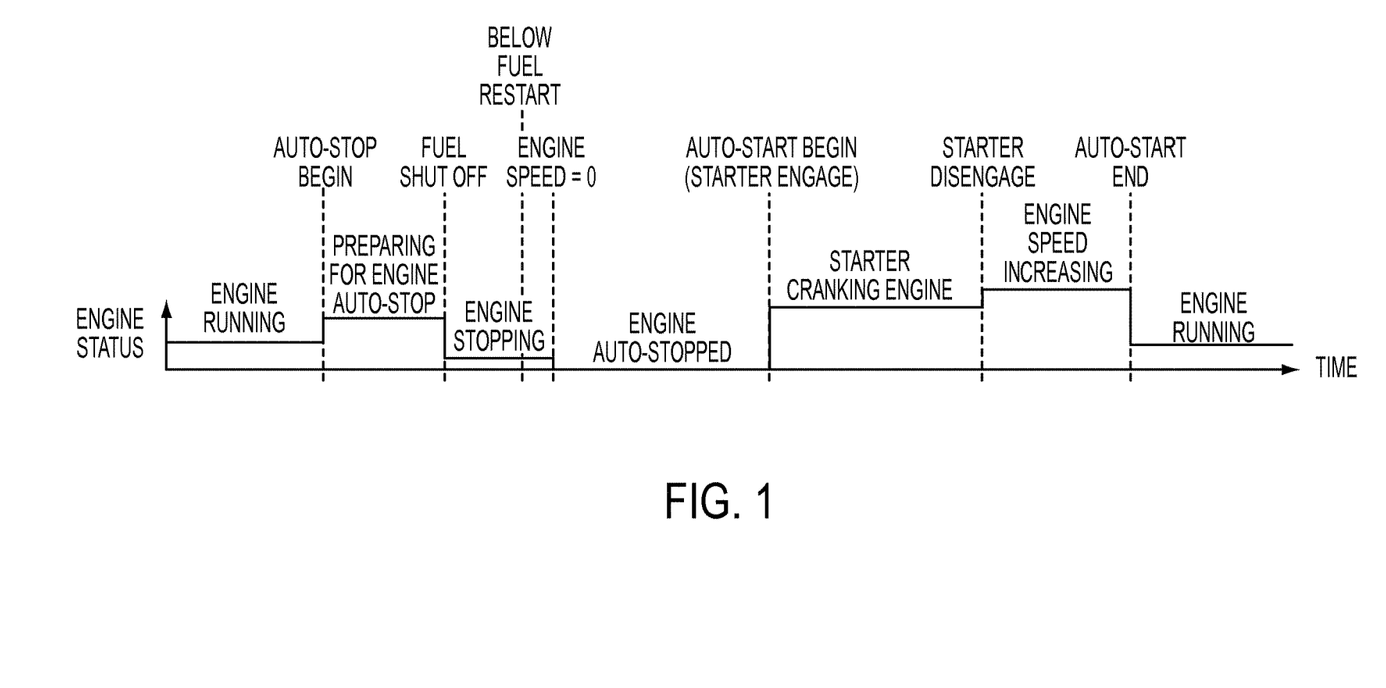
FIG. 1 is a plot illustrating engine status during an auto-stop.

With reference to FIG. 1, an engine stop-start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In stop-start vehicles, the stop-start system may automatically shut down the engine in order to save fuel, and at a later time automatically restart the engine. However, when the engine is auto stopped, mechanically driven components will generally also stop.

One such component is the transmission pump. Automatic transmissions generally rely on hydraulic actuators acting as clutches or brakes. The hydraulic pressure to actuate the clutches and brakes is usually maintained by a mechanically driven transmission pump. During an engine auto-stop the transmission pump will stop, causing the hydraulic pressure to bleed down. During a prolonged engine auto-stop, this may result in the transmission clutches and brakes releasing, shifting the transmission into a neutral state. When the engine is auto-started, the mechanical pump is reactivated and must increase hydraulic pressure before the transmission is shifted into gear again, resulting in a delay. This effect may be mitigated by reducing bleed-down leakage to a rate that supports engine auto-stops lasting for several minutes. This solution requires very tight tolerances on machined components, and thus may not be cost-effective or feasible. Another solution is to provide an electric auxiliary transmission pump. This pump may operate on battery power while the engine is auto stopped. Hydraulic pressure is thus maintained, and the transmission remains in gear enabling rapid torque transmittal to vehicle drive wheels after the engine restarts.

Another mechanically driven component that stops during an engine auto stop is the engine coolant pump. Consequently, during an engine auto stop, coolant no longer flows from the engine to the heater core radiator for the cabin heater and windscreen defroster. The discharged air thus cools after the engine is auto stopped, reducing driver satisfaction. This effect is generally mitigated using another electric pump to support the flow of coolant through the heater core from the hot engine block.

Figure 2:
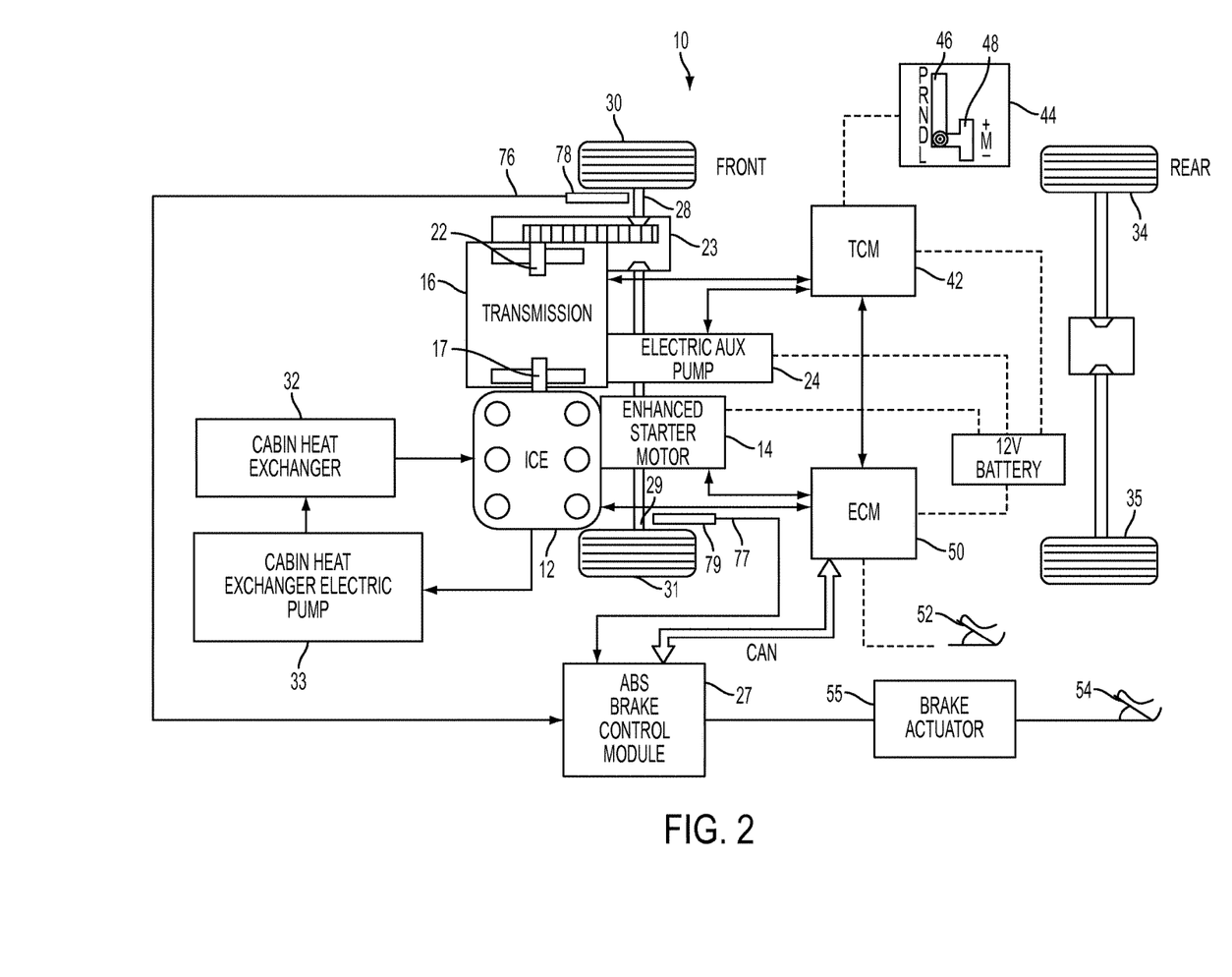
FIG. 2 schematically illustrates a stop-start vehicle having separate auxiliary transmission and cabin heat exchanger pumps.
Figure 3A:
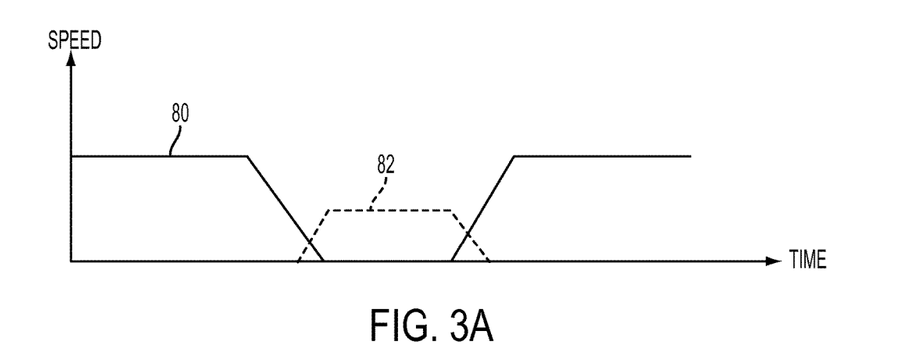
FIGS. 3a and 3b illustrate transmission pump and coolant pump behavior during an auto-stop event in a vehicle as illustrated in FIG. 2.
Figure 3B:
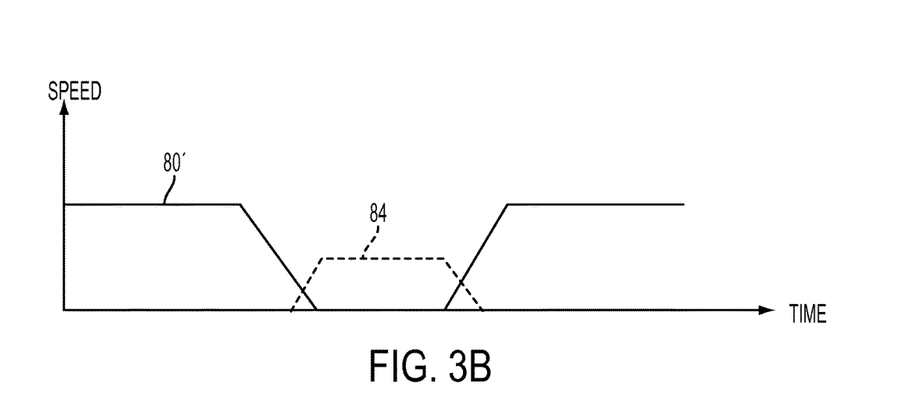

Referring to FIG. 2 in conjunction with FIGS. 3*a* and 3*b*, a stop/start vehicle 10 incorporating two electric motors and operation thereof is illustrated. The stop/start vehicle 10 includes a power source 12, such as an internal combustion engine; an enhanced engine starter motor 14; an automatic transmission 16, whose input shaft 17 is connected through a torque converter to the engine; a transmission output 22; final drive mechanism 23 connected to the output 22; an electric auxiliary hydraulic pump (EAUX) 24, whose output pressurizes the hydraulic system of the transmission; an electric storage battery 26, which supplies electric power to the pump 24, ABS module 27; axle shafts 28, 29, drivably connect to the driven wheels 30, 31; and a cabin heat exchanger 32 in fluid communication with coolant passages in the internal combustion engine 12 and with a cabin heat exchanger electric pump 33.

A transmission control module (TCM) 42 receives and sends signals to the pump 24 and transmission 16 and receives input signals from the battery 26 and a gear shifter 44, which moves among P, R, N, D, L positions in an automatic mode channel 46 and between upshift (+) and downshift (−) positions in a manual mode channel 48. The TCM 42 additionally controls the EAUX pump 24. An engine control module (ECM) 50, which communicates through a CAN with a brake control module 27, receives and sends signals to the starter 14 and engine 12 and receives input signals from the battery 26 and an accelerator pedal 52. Signals representing movement of brake pedal 54 are transmitted through a brake actuator 55 to the brake control module 27, which controls fluid pressure in brake lines 76, 77 and wheel brakes 78, 79. The ECM 50 additionally controls the cabin heat exchanger electric pump 33.

When an engine auto stop is initiated, engine speed 80 drops to zero as the engine shuts down. To maintain coolant flow, the electric heat exchanger pump 33 is spun up to a non-zero motor speed 82 in response to a command from ECM 50. When the engine is auto started, the engine speed 80 increases and the heat exchanger pump may be deactivated. Similarly, as engine speed 80' drops to zero during an auto stop event, the auxiliary transmission pump 24 is spun up to a non-zero motor speed 84 in response to a command from TCM 42 to maintain hydraulic pressure in the transmission. When the engine is auto started, the engine speed 80' increases and the auxiliary transmission pump may be deactivated.

This method ensures that sufficient hydraulic pressure is present and that the cabin heat exchanger remains operational during engine auto stop events. However, having two electric pump motors increases the cost of manufacturing motor components, motor electronic controls, and motor packaging within the vehicle.

Figure 4:
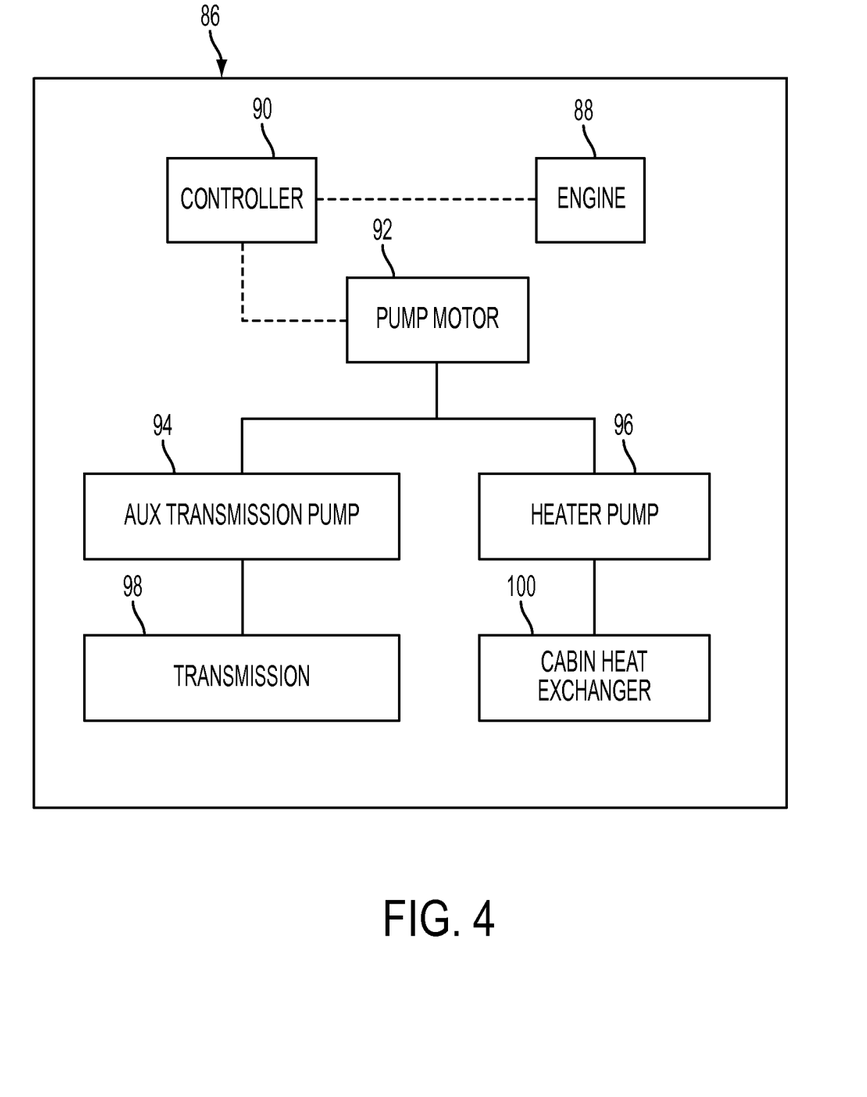
FIG. 4 schematically illustrates a stop-start vehicle having a combined pump motor.

Referring now to FIG. 4, a stop/start vehicle 86 with a common electric pump motor according to the present disclosure is illustrated schematically. The vehicle 86 includes an internal combustion engine 88 in communication with or under the control of at least one controller 90. The controller 90 may be an ECM or other controller or controllers as appropriate. The controller 90 controls a pump motor 92. The pump motor 92 is a common pump motor configured to drive both an auxiliary transmission pump 94 and a cabin heat exchanger pump 96. The auxiliary transmission pump 94 is in fluid communication with a transmission 98 and configured to maintain hydraulic pressure in the transmission 98 when the engine 88 has been auto stopped. The cabin heat exchanger pump 96 is in fluid communication with a cabin heat exchanger 100 and configured to circulate coolant between the cabin heat exchanger 100 and coolant passages in the engine 88 when the engine has been auto stopped.

Figure 5A:
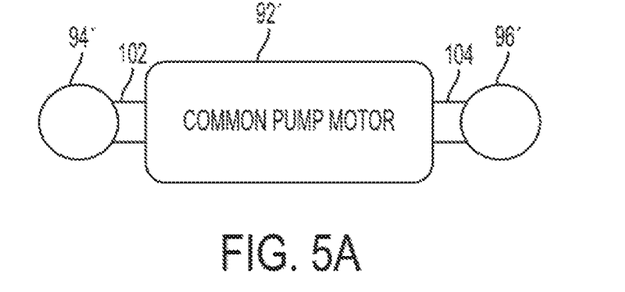
FIGS. 5a, 5b, and 5c illustrate various pump motor configurations in a stop-start vehicle.

Referring now to FIG. 5a, one embodiment of a common pump motor is shown. In this embodiment, the common pump motor 92' has two opposing end shafts. A first end shaft 102 mechanically drives an auxiliary transmission pump 94'. The first end shaft 102 may drive the auxiliary transmission pump directly or indirectly via a gear set, pulleys, belts, or other appropriate driving connections. A second end shaft 104 mechanically drives a cabin heat exchanger pump 96'. The second end shaft 104 may similarly drive the cabin heat exchanger pump 96' directly or indirectly. In the exemplary variation shown in FIG. 5c, the common pump motor 92''' is configured to directly drive an auxiliary transmission pump 94''' via a first end shaft 102'. In addition, the common pump motor 92''' is configured to indirectly drive a cabin heat exchanger pump 96''' via a second end shaft 104', a gear set including a first axis transfer gear 93 and a second axis transfer gear 95, and a lay shaft 103.

Figure 5B:
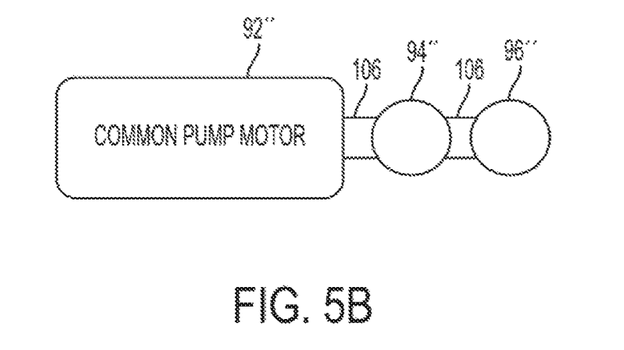
Figure 5C:
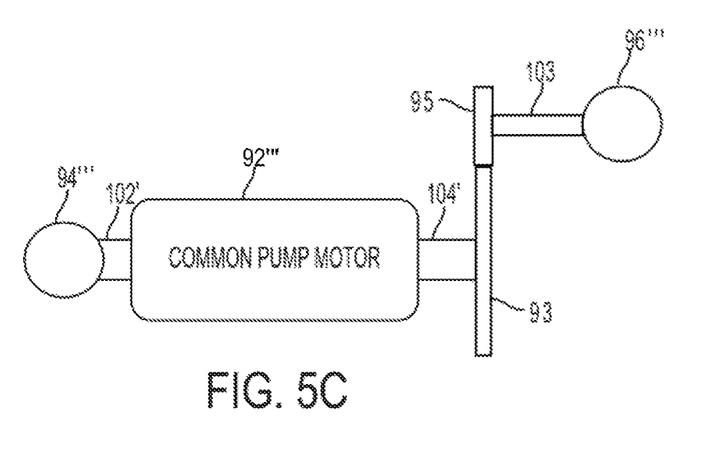

Referring now to FIG. 5b, an alternative embodiment of a common pump motor is shown. In this embodiment, the common pump motor 92" has a single end shaft 106. The end shaft 106 mechanically drives both an auxiliary transmission pump 94" and a cabin heat exchanger pump 96". The end shaft 106 may drive both the auxiliary transmission pump 94" and the cabin heat exchanger pump 96" directly or indirectly or a combination thereof, as described above. In this embodiment the cabin heat exchanger pump 96" is connected to the end shaft 106 outboard of the connection between the auxiliary transmission pump 94" and the end shaft. In other embodiments the auxiliary transmission pump may be connected to the end shaft outboard of the cabin heat exchanger pump.

Figure 6:
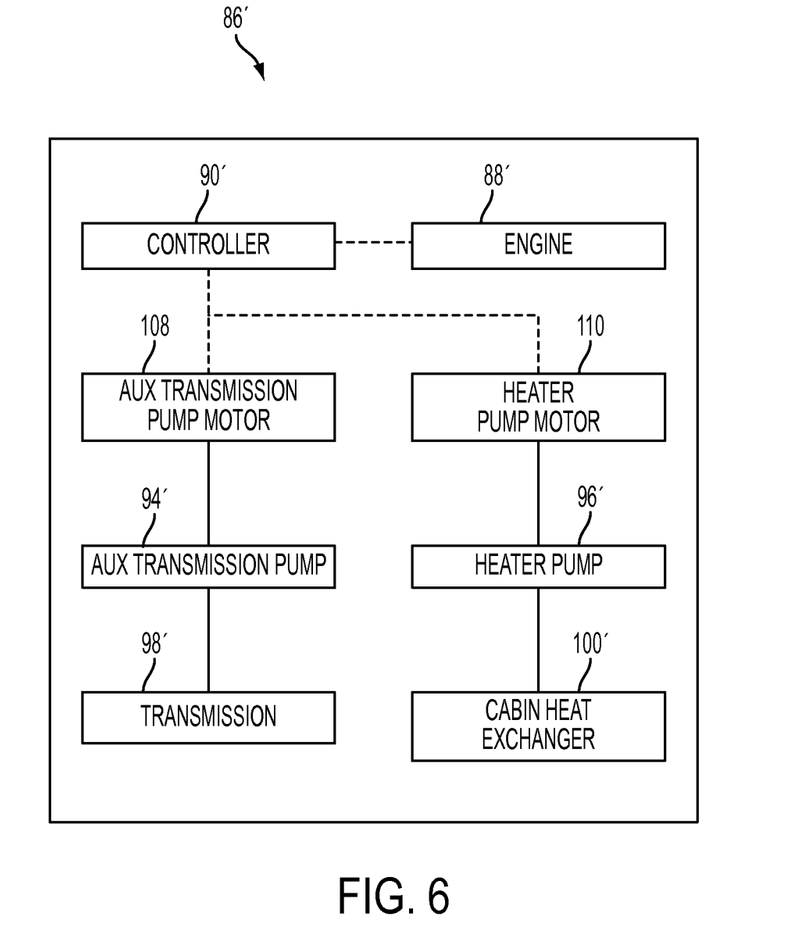
FIG. 6 schematically illustrates a stop-start vehicle having a combined pump control system.

Referring now to FIG. 6, an alternative embodiment of a stop/start vehicle 86' is shown. This embodiment includes an internal combustion engine 88' a single controller 90' issues commands to an auxiliary transmission pump motor 108 and a heater pump motor 110. The auxiliary transmission pump motor 108 drives an auxiliary transmission pump 94', and the heater pump motor 110 drives a heater pump 96'. The auxiliary transmission pump 94' is in fluid communication with a transmission 98' and configured to maintain hydraulic pressure in the transmission 98' when the engine 88' has been auto stopped. The cabin heat exchanger pump 96' is in fluid communication with a cabin heat exchanger 100' and configured to circulate coolant between the cabin heat exchanger 100' and coolant passages in the engine 88' when the engine has been auto stopped.

As in previous solutions, two separate motors are used in this embodiment. However, in this configuration a unified control system is implemented to issue commands to both the heater pump motor 110 and the auxiliary transmission pump motor 108. Unifying the controls into a single controller 90' eliminates complexity in the system. This may include delivering a common electrical voltage through a single shared controller output connection to both pumps simultaneously through a shared parallel wiring connection.

Figure 7:
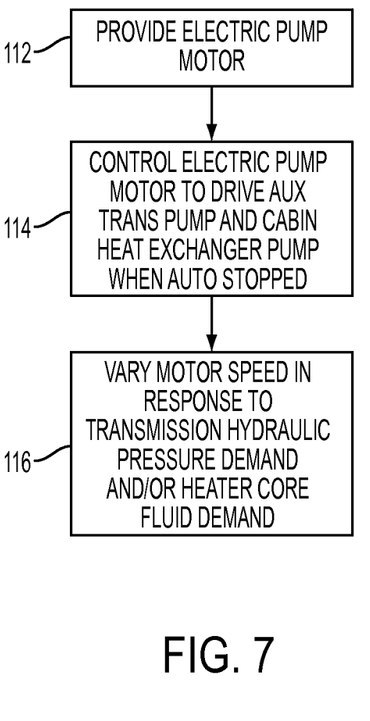
FIG. 7 is a flowchart illustrating a method of controlling a pump motor in a stop-start vehicle.

Referring now to FIG. 7, a method for controlling a stop/start vehicle includes providing an electric pump motor, as illustrated at block 112. The method additionally includes controlling the electric pump motor to drive an auxiliary transmission pump and a cabin heat exchanger pump in response to the engine being auto stopped, as illustrated at block 114. The method further includes varying the motor speed in response to a transmission hydraulic pressure demand and/or a heater core coolant demand.

As can be seen from the above disclosure, the present invention provides a stop-start vehicle having a combined pump motor control system for both an auxiliary transmission pump and a cabin heat exchanger pump. Some embodiments according to the present invention also provide a common pump motor driving both the auxiliary transmission pump and the cabin heat exchanger pump. The control structure is thus simplified and redundant components may be eliminated, reducing cost, weight, and complexity.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an internal combustion engine;
an electric pump motor drivably coupled to a transmission pump and a heat exchanger pump; and
at least one controller programmed to auto-stop and auto-start the engine and, in response to auto-stopping the engine, control the pump motor to drive the transmission pump to supply hydraulic pressure to a transmission and to drive the heat exchanger pump to provide flow from the engine to a heater core radiator and, in response to auto-starting the engine, deactivate the heat exchanger pump and the transmission pump.

2. The vehicle of claim 1, wherein the electric pump motor has an end shaft configured to drive the transmission pump and the heat exchanger pump.

3. The vehicle of claim 1, wherein the electric pump motor has a first end shaft configured to drive the transmission pump and an opposing second end shaft configured to drive the heat exchanger pump.

4. The vehicle of claim 1, wherein the electric pump motor is configured to directly drive one of the transmission pump and the heat exchanger pump and indirectly drive the other of the transmission pump and the heat exchanger pump.

5. The vehicle of claim 1, wherein the electric pump motor is a variable speed motor.

6. A method for controlling a vehicle comprising:
auto-stopping an engine of the vehicle;
in response to the engine being auto-stopped, controlling an electric pump motor drivably coupled to a transmission pump and a heat exchanger pump to drive the transmission pump to supply hydraulic pressure to a transmission and to drive the heat exchanger pump to provide flow from the engine to a heater core radiator;
auto-starting the engine; and
in response to the engine being auto-started, deactivating the transmission pump and the heat exchanger pump.

7. The method of claim 6, wherein controlling the electric pump motor includes varying a motor speed in response to a transmission hydraulic pressure demand or a heater core fluid demand.

8. A stop-start system for a vehicle including an engine comprising:
a controller programmed to, in response to the engine being auto-stopped, control at least one electric pump motor to operate a transmission pump to supply hydraulic pressure to a transmission and to operate a heat exchanger pump to provide flow from the engine to a heater core radiator and, in response to the engine being auto-started, deactivate the transmission pump and the heat exchanger pump.

9. The system of claim 8, wherein the at least one electric pump motor is drivably coupled to the transmission pump and to the heat exchanger pump.

10. The system of claim 9, wherein the electric pump motor has an end shaft configured to drive the transmission pump and the heat exchanger pump.

11. The system of claim 9, wherein the electric pump motor has a first end shaft configured to drive the transmission pump and an opposing second end shaft configured to drive the heat exchanger pump.

12. The system of claim 9, wherein the electric pump motor is configured to directly drive one of the transmission pump and the heat exchanger pump and indirectly drive the other of the transmission pump and the heat exchanger pump.

13. The system of claim 9, wherein the electric pump motor is a variable speed motor.

* * * * *